United States Patent Office 3,539,572
Patented Nov. 10, 1970

3,539,572
2,5-DIKETO PIPERAZINES
Günter Schröder, Ramstadt-Eiche, and Herbert Fink, Bickenbach, Germany, assignors to Rohm & Haas G.m.b.H., Darmstadt, Germany
No Drawing. Filed Nov. 7, 1967, Ser. No. 681,105
Claims priority, application Germany, Nov. 19, 1966, R 44,613
Int. Cl. C07d 51/68
U.S. Cl. 260—268    3 Claims

ABSTRACT OF THE DISCLOSURE

Method for making 2,5-diketo piperazines having aliphatic or aromatic substituents in the 3- and 6-positions, which are useful as intermediates in the preparation of bleaches, hardeners for gelatine, and textile treating agents, from correspondingly α-substituted α-amino acids by heating said acids with carbon dioxide, ammonia, and water.

---

The present invention relates to 2,5-diketo piperazines and to methods of making the same.

2,5-diketo piperazines have heretofore been prepared from α-amino carboxylic acids or their functional derivatives, or from dipeptides, according to a number of different processes. In the simplest case, a dry amino acid or dipeptide is heated. Heating in glycol or glycerine is more protective, and the cyclization of dipeptides or of amino acids can be promoted by agents cleaving water, such as acetic anhydride, phosphorus pentoxide and polyphosphoric acids, titanic acid esters and the like.

The lower esters of dipeptides can be condensed under very mild conditions. However, the starting materials can only be prepared by a laborious synthesis. Likewise, amino acids having a reactive group such as a chloride or anhydride group near the carboxy group or the amino group, for example a carbobenzoxy group or a cyanoethyl group, cyclize under relatively mild conditions, but the starting materials are not common.

Thus, an economical production of diketo piperazines has heretofore been hindered because the available syntheses either require reaction conditions producing low yields and a high proportion of decomposition products or employ costly reagents. In particular, diketo piperazines substituted in the 3- and/or 6-position have heretofore not been prepared, or have been prepared only in very small yields.

According to the present invention, it has been found that 2,5-diketo piperazines can, surprisingly, be formed in good yield if an α-amino carboxylic acid is heated at a temperature over 150° C. with carbon dioxide, ammonia and 1–20 mols of water per mol of α-amino carboxylic acid. The diketo piperazine formed can be directly filtered off if it is insoluble in the amount of water employed, or it can be separated by conventional methods.

According to the process of the invention, α-amino acids of the following formula can be employed:

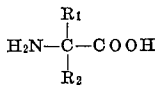

wherein $R_1$ is hydrogen or a saturated or unsaturated straight chain or branched aliphatic radical, $R_2$ is a saturated or unsaturated straight chain or branched aliphatic radical or an aromatic radical, and wherein $R_1$ and $R_2$ when taken together with the carbon atom to which they are attached, can also form a carbocyclic ring. $R_1$ and $R_2$ may be hydrocarbon radicals or, if aliphatic, may be alkoxy-substituted. If aromatic, they may be hydroxy, alkoxy, or alkyl substituted.

Typical aliphatic radicals present as $R_1$ and/or $R_2$ in the diketo piperazines of interest include those having 1 to 18 carbon atoms and include compounds containing ether linkages, e.g., methyl, ethyl, propyl, butyl, isobutyl, t-butyl, hexyl, 2-ethylhexyl, octyl, dodecyl, stearyl, allyl, oleyl, ethoxyethyl, carboxyethyl, butoxyethyl, and polyoxyethylene residues of the formula $H_3CCH_2-(OCH_2CH_2)_n-$, where $n$ is 2 to 8.

Typical aromatic radicals present as $R_2$ include phenyl, tolyl, naphthyl, t-butyl phenyl, nonyl phenyl, methoxy phenyl, hydroxy phenyl, butoxy phenl, butoxy tolyl, and methoxy naphthyl.

The diketo piperazines derivable therefrom have the formula

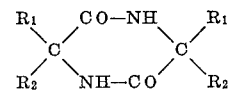

wherein $R_1$ and $R_2$ have the meaning given above.

Exemplary starting materials include alanine, α-amino isobutyric acid, leucine, isoleucine, phenyl alanine, and hydroxyphenyl alanine. Other amino acids are known from the following literature sources, in which "Ber." refers to Berichte der Chemischen Gesellschaft and "Ann." to Liebigs Annalen der Chemie.

α-amino butyric acid, Ber. 41, 2062 (1908);
α-amino valerianic acid, Ann. 211, 359 (1882);
valine, Ber. 35, 401 (1902);
α-amino caproic acid, Ann. 362, 336 (1909);
α-amino-γ-phenyl butyric acid, Ber. 39, 2213 (1906);
α-amino-α-methyl ethylacetic acid, Ber. 39, 1184, 1189 (1906);
α-amino-methylcaproic acid, Ber. 39, 1192 (1906);
α-amino-diethylacetic acid, Ber. 42, 4473 (1909);
amino-hexahydrobenzoic acid, Ber. 39, 1728 (1906);
amino-dibutylacetic acid, Comptes rendus, Hebd. d. Seances 227, 512 (1948);
amino-cyclopentanecarboxylic acid, Hoppe-Seylers Zeitschrift für physiol. Chemie, 75, 350 (1911).

2,5-diketo piperazines having four different substituents in the 3- and 6-positions are obtained if at least two different starting materials are concurrently employed in the process of the present invention.

Instead of using a pure α-amino carboxylic acid as the starting material, an aqueous solution of the amino acid can also be employed. Such a solution is formed, for example, by the reaction of an aldehyde cyanohydrin or of a ketone cyanohydrin, or of an equimolar mixture of hydrocyanic acid and an aldehyde or ketone, with ammonio and carbon dioxide under pressure, as taught in commonly owned copending U.S. patent application Ser. No. 653,597, filed June 28, 1967. As there taught, temperatures above 100° C. are employed, and ammonium bicarbonate or ammonium carbonate can be used, alone or with ammonia, in place of ammonia and carbon dioxide. Suitable ranges of the various components useful in the reaction have been found to be in an approximate mole ratio with the carbonyl compound as follows: hydrocyanic acid from 1:1 to 3.5:1; carbon dioxide from 1:1 to 10:1; ammonium carbonate from 1:1 to 10:1; ammonia from 1:1 to 200:1; and water from 20:1 to 1000:1. These solutions of α-amino carboxylic acids, which are preferably formed using 20 to 100 mols of water per mol of carbonyl compound or cyanohydrin are suitably concentrated to a water content of 1 to 20 mols per mol of α-amino carboxylic acid and then reacted according to the process of the present invention. However the amino carboxylic acid solutions can be reacted according to the present invention without concentration if no more than 20 mols of water are employed in their preparation. In this manner without isolation of an intermediate product, corresponding diketo piperazines are formed from aldehydes or ketones such as acetaldehyde, benzaldehyde, phenyl acetaldehyde, acetone, diethyl ketone, cyclopentanone, or cyclohexanone. The pressure generated during the course of the reaction is variable over wide limits depending on the amounts of materials employed and the reaction conditions, but as a rule is between 5 and 100 atmospheres.

Ammonia and carbon dioxide are advantageously used in amounts of at least one mol, preferably 4-15 mols, per mol of α-amino carboxylic acid employed. The two materials can be added to a reaction vessel together in the form of ammonium carbonate, ammonium bicarbonate, or ammonium carbamate, or can be added separately as gaseous, liquid, or aqueous ammonia and as gaseous or solid carbon dioxide. Limits on the quantities of ammonia and carbon dioxide employed, as well as on the reaction temperature, which in general lies between 150° C. and 200° C., are primarily imposed, on the one hand, by the highest pressure permissible in the reaction vessel and, on the other hand, by the economics of the process.

The majority of diketo piperazines are insoluble in water and can be directly obtained by filtration of the reaction mixture. Further purification, if necessary, proceeds by known methods involving washing with water or solvents, or by recrystallization.

According to the process of the invention, diketo piperazines are obtained in yields of over 70 percent of theory. Since amino carboxylic acid which is not reacted in the preparation of the diketo piperazines is soluble in water, at least in the form of its salt, its separation presents no difficulties.

The new synthesis for diketo piperazines offers numerous possibilities for the preparation of useful organic products heretofore not obtainable on a technical scale. U.S. Pat. No. 3,142,530 teaches the chlorination of 3,6-dialkyl-2,5-diketo piperazines to prepare cotton bleaches. Bis-methylol compounds of 2,5-diketo piperazines, obtained by the reaction of formaldehyde therewith, are useful for modifying carbamide resins, or for hardening gelatin in photographic processes, are taught in U.S. Pat. No. 2,586,168. The same compounds are taught in Belgian Pat. No. 651,213 to impart wrinkle-free finishes to cellulosic fibers.

A better understanding of the present invention and of its many advantages will be had by referring to the following specific examples, given by way of illustration.

EXAMPLE 1

2,2,5,5-tetramethyl-3,6-diketo piperazine

A mixture of 103 grams (1 mol) of α-amino isobutyric acid, 18 grams (1 mol) water and 118.5 grams (1.5 mols) of ammonium bicarbonate was heated in an autoclave for six hours at 200° C. A pressure of 800 atmospheres was generated. The reaction mixture, after cooling to room temperature, was combined with one liter of water and the solution heated to 60°–70° C. By filtration at this temperature, 61.2 grams (72 percent of theory) of difficultly soluble 2,2,5,5-tetramethyl-3,6-diketo piperazine were obtained.

EXAMPLE 2

2,5-diisopropyl-3,6-diketo piperazine 58.5 grams (0.5 mol) of (d,l)-β-methyl-α-amino butyric acid (d,l-valine), 18 grams (1 mol) of water, and 79 grams (1 mol) of ammonium bicarbonate were heated at 180° C. for six hours in an autoclave, generating a pressure of 25 atmospheres. After cooling to room temperature the reaction mixture was combined with 0.5 liter of water. The solution was then heated to 60°–70° C. and filtered at this temperature. The filter residue was washed in water, then with alcohol, and finally with ether. After drying at 100° C., 23.9 grams (48.2 percent of theory) of 2,5-diisopropyl-3,6-diketo piperazine were obtained.

EXAMPLE 3

2,5-di(spiro-tetramethylene)-3,6-diketo piperazine 58 grams (0.45 mol) of 1-amino-cyclopentane carboxylic acid-(1), 18 grams (1 mol) of water, and 158 grams (2 mols) of ammonium bicarbonate were heated in an autoclave for six hours at 180° C. After cooling of the reaction mixture to room temperature, 0.5 liter of water was added. The solution was warmed to 60° C. and filtered at this temperature. As a residue, 31.9 grams (64.0 percent of theory of 2,5-di-(spiro-tetramethylene)-3,6-diketo piperazine were obtained. The material is very difficultly soluble in water.

In the following examples, the preparation of diketo piperazines from corresponding cyanohydrins is described. The cyanohydrins are converted to amino carboxylic acids in a first reaction stage and then condensed to diketo piperazines in a second stage.

EXAMPLE 4

2,2,5,5-tetramethyl-diketo piperazine 85 grams (1 mol) of acetocyanohydrin, 18 grams (1 mol) of water, and 118.5 grams (1.5 mols) of ammonium bicarbonate were heated in an autoclave for 10 hours at 200° C. A pressure of 75–80 atmospheres was generated. The reaction mixture, after cooling to room temperature, was combined with one liter of water and the solution heated to 60°–70° C. At this temperature, difficultly soluble 2,2,5,5-tetramethyl-3,6-diketo piperazine was removed by filtration. The filter residue was first washed with water, then with alcohol, and finally with ether. After drying in a vacuum drying cabinet at 110° C., 42.5 grams (50 percent of theory) of 2,2,5,5-tetramethyl-diketo piperazine were obtained.

EXAMPLE 5

2,5-dibenzyl-3,6-diketo piperazine 36.9 grams (0.25 mol) of phenyl acetaldehyde cyanohydrin, 18 grams (1 mol) of water, and 79 grams (1 mol) of ammonium bicarbonate were heated in an autoclave for six hours at 180° C. A pressure of 30 atmospheres was generated. After cooling of the reaction mixture to room temperature, 0.5 liter of water was added. The solution was warmed to 60° C and filtered at this temperature. The filter residue comprised difficultly soluble 2,5-dibenzyl-3,6-diketo piperazine which was washed with water, alcohol, and ether, and dried. 22.1 grams (68 percent of theory) of 2,5-dibenzyl-3,6-diketo piperazine were obtained.

EXAMPLE 6

2,5-di-(spiro-tetramethylene)-3,6-diketo piperazine 111 grams (1 mol) of cyclopentanone cyanohydrin, 72 grams (4 mols) of water, and 474 grams (6 mols) of ammonium bicarbonate were heated in an autoclave for six hours at 180° C. A pressure of 80 atmospheres was generated. By further processing as in Example 5, 48.5 grams (43.6 percent of theory) of 2,5-di-(spiro-tetramethylene)-3,6-diketo piperazine were obtained.

We claim:

1. The method of making a 2,5-diketo piperazine of the formula

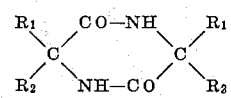

wherein $R_1$ taken alone is hydrogen or lower alkyl; $R_2$ taken alone is lower alkyl or phenyl lower alkyl; and $R_1$ and $R_2$, taken together with the carbon atom to which they are joined, are lower cycloalkyl; which method comprises heating an α-amino carboxylic acid of the formula

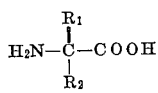

wherein $R_1$ and $R_2$ have their earlier meaning, at a temperature between 150° C. and 200° C. and under autogenous pressure with carbon dioxide, ammonia, and 1 to 20 molar parts of water per molar part of amino acid.

2. The method as in claim 1 wherein said amino acid and water are present as a solution prepared by pre-reacting ammonia, carbon dioxide, and water with a corresponding precursor cyanohydrin to form said amino acid.

3. The method as in claim 1 wherein said ammonia and carbon dioxide are supplied to the reaction by a member selected from the group consisting of ammonium carbonate, ammonium bicarbonate, and ammonium carbamate.

References Cited

UNITED STATES PATENTS

| 952,006 | 3/1910 | Fourneau | 260—268 X |
| 2,743,269 | 4/1956 | Blicke | 260—268 X |
| 3,142,530 | 7/1964 | Kokorudz | 424—250 X |
| 3,167,561 | 1/1965 | Sarett | 260—268 X |

FOREIGN PATENTS 566,094  12/1932  Germany.

DONALD G. DAUS, Primary Examiner

U.S. Cl. X.R.

8—107, 120; 96—111; 260—465.6, 514, 518, 534, 599, 601